July 31, 1962 V. H. BAKER 3,047,045
TUBE EXPANDER
Filed Feb. 24, 1959
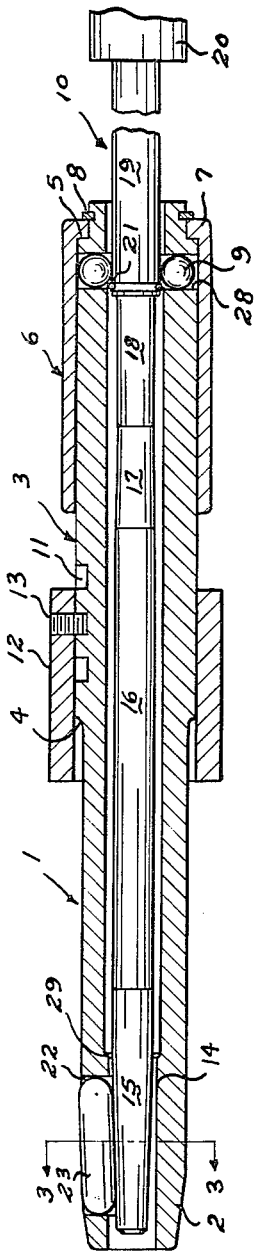
Fig-1
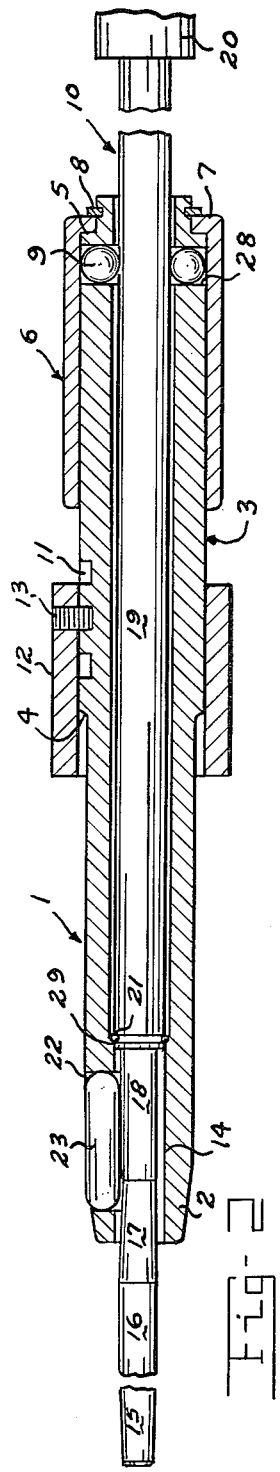
Fig-2
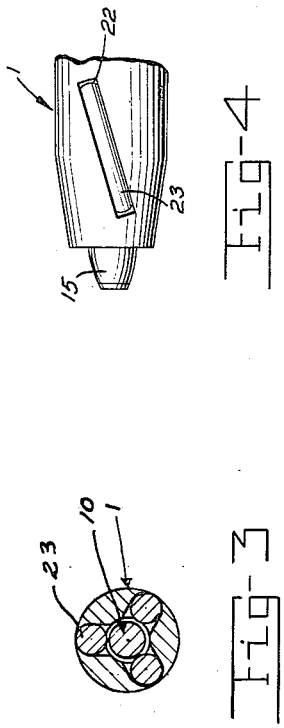
Fig-4
Fig-3
INVENTOR.
VIRGIL H. BAKER
BY Tom Walker
ATTORNEY United States Patent Office 3,047,045
Patented July 31, 1962

3,047,045
TUBE EXPANDER
Virgil H. Baker, Springfield, Ohio, assignor to Carrier Corporation, Syracuse, N.Y., a corporation of Delaware
Filed Feb. 24, 1959, Ser. No. 795,126
12 Claims. (Cl. 153—82)

This invention relates to tube expanders and more particularly to an improved tube expander unit capable of both protractive and retractive operation.

Much research and development has been directed to improvement of tube expanders in an effort to improve end products such as boilers and condensers. Heat exchange tubes are mounted through holes in tube sheets in fabricating condensers following which their end portions must be radially expanded to form a seal with the tube sheets. It is important that the seal be smooth and uniform to prevent breakaway of the tubes from the tube sheet and a consequent breakdown of the balanced system of which they are a part. Since the tubes and tube sheets are quite expensive, it is also very important that the seal of the tubes to the tube sheets be effected in a firm yet gentle manner so neither the tube or tube sheet is so deformed in their connection that the tube cannot be replaced without replacement of the tube sheet.

Various tube expanders have been proposed and are in use for this type of application. However, they reveal a common deficiency. Considerable friction is developed in their use with consequent wear of their component parts and a resultant deterioration of the quality of joint they produce in operation. The more irregularities produced in a tube as expanded, the poorer the joint. Also, with excessive friction in operation of a tube expander, there is a substantial and unnecessary consumption of power in the process.

The present invention not only provides a tube expander the construction of which minimizes internal friction and component wear in use, but also affords an expander which is capable of both protractive and retractive operation. A feature of importance is the simplicity and economy of the expander fabricated in accordance with the invention.

The object of the invention is to simplify the construction as well as the means and mode of operation of tube expanders, whereby such expanders may not only be economically manufactured, but will be more efficient and satisfactory in use, adaptable to a wide variety of applications, and be unlikely to get out of order.

A further object of the invention is to provide an improved tube expander of simple construction which is capable of both protractive and retractive operation.

Another object of the invention is to provide a tube expander construction which minimizes internal friction and reduces the power required for expander operation.

A further object of the invention is to provide a tube expander possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a longitudinal sectional view of a tube expander in accordance with the invention with the operating mandrel in a completely retracted position;

FIG. 2 is a similar view of the apparatus of FIG. 1 with the mandrel in a protracted or projected condition;

FIG. 3 is a cross-sectional view taken along line 3—3 of FIG. 1; and

FIG. 4 is a fragmentary plan view of the tube expander of the invention illustrating the "skewed" nature of the rollers employed.

Like parts are indicated by similar characters of reference throughout the several views.

In the drawings the embodiment shown includes a tubular cage 1 which has a short conically tapered portion 2 at one extremity. The cage 1 has a radially expanded section 3 which extends from adjacent its center toward its other extremity. The section 3 defines an annular shoulder 4 to the end most adjacent the cage portion 2 and an annular shoulder 5 to its other end, adjacent and spaced from the other extremity of the cage.

A cylindrically formed tubular sleeve 6 bears concentrically on one end of the radially expanded portion 3 of the cage 1 to dispose an internal flange 7 integral with one end thereof in abutment with and bearing on the shoulder 5. An annular groove in the cage 1 adjacent the outermost face of flange 7 seats an annular lock ring 8 which confines the flange 7 to shoulder 5 and prevents longitudinal displacement of sleeve 6 thereby. The cage section 3 has a series of circumferentially spaced radial holes 28 receiving ball bearings 9 which are contained between sleeve 6 and a mandrel 10 projecting axially through cage 1. The sleeve 6 is made freely rotatable on the cage section 3 thereby.

The portion of cage section 3 adjacent shoulder 4 is provided with a series of three longitudinally spaced cylindrical recesses 11. A limit collar 12 which mounts about the cage section 3 adjacent shoulder 4 has a screw 13 projected therethrough adapted to be selectively engaged in a recess 11 so as to have collar 12 project beyond shoulder 4 toward the tapered portion 2 of the cage 1 a predetermined amount, for purposes to be further described.

The internal diameter of the cage 1 is generally uniform except for the end portion 14 within the conically tapered section 2 and slightly inwardly thereof which is uniformly reduced in diameter to provide a shoulder 29.

The mandrel 10, which projects concentrically through cage 1, has a conical tapered section 15 on its projecting extremity, inwardly of which the diameter of the mandrel is uniform for a substantial portion 16. The diameter of the portion 16 is identical with that of the connecting base of the tapered section 15. A short section 17 of the mandrel, inwardly of the length 16, is tapered similarly to section 15, but in the opposite direction. The smallest dimension of the taper section 17 is uniformly maintained inwardly therefrom to provide a short uniform mandrel section 18 terminated by a radial expansion of the mandrel to provide a drive section 19 connected to the drive unit 20 which is constituted by a reversible motor.

As shown in FIG. 1 of the drawings, the section 19 in the rearmost position of the mandrel has its forward end immediately forward of the ball bearings 9 contained in cage section 3 thereabout. This forward end of mandrel section 19 has an annular recess seating a radially projecting limit ring 21 which abuts bearings 9 to determine the rearmost position of mandrel 10 in cage 1. In this rearmost position, the conically tapered end section 15 of the mandrel projects within the tapered end section 2 of the cage.

Elongated apertures 22 are provided in section 2 of cage 1, spaced equidistantly thereabout and extending rearwardly thereof, having their axes commonly diverted from longitudinal alignment with the central longitudinal axis of the cage. The apertures 22 are uniformly angled in the normal direction of rotation of the mandrel. Rollers 23 are conventionally confined in cage 1 within apertures 22 to have their inner surfaces commonly bear on mandrel 10. In FIG. 1, the rollers bear on the tapered extremity of the mandrel so as to lie within the cage section 2.

The embodiment of the invention described provides a tube expander which may operate either protractively or retractively with a minimum of friction. For example, for protractive tube expansion, with the mandrel at its rearmost position in the cage, the extremity 2 of the cage is introduced within a tube to expand it to lock to a tube sheet. The sleeve 6 may be grasped to hold the expander as the mandrel drive is energized to rotate the mandrel. An initial forward motion of the mandrel relative the cage gradually moves the rollers 23 outwardly of the cage causing them to ride up on mandrel taper 15 to engage the tube wall. The skew disposition of the rollers 23, as they engage the tube wall while bearing on the mandrel and are driven thereby, causes the cage to rotate with the rollers and the whole assembly to screw itself into the tube to gradually and smoothly expand it without interruption. The relationship of the components is such that the mandrel rotates faster than the cage and thereby advances relative the cage as the components screw themselves in the tube. The skewed rollers reversely act on the mandrel as it is rotated to cause its automatic advance relative the cage and into the tube. Collar 12 limits the advance of the cage in the tube by engaging the tube sheet. When the tube expansion is complete the mandrel has been advanced relative the cage to a position shown in FIG. 2 of the drawings, limited by engagement of ring 21 to the internal shoulder 29 in the cage. Here the reduced section 18 of the mandrel aligns with the rollers 23 which drop inwardly of cage 1, riding smoothly down over the reverse taper 17 of the mandrel as it advances relative the cage, avoiding abrupt interruption of the rolling operation and irregularities in the tube wall thereby. With the rollers thus retracted in the cage, the expander may be easily withdrawn.

For retractive operation of the expander assembly, the cage 1 is inserted within the tube with the mandrel 10 relatively projected in a position indicated in FIG. 2 of the drawings. Collar 12 is engaged to the tube sheet mounting the tube. The setting of the collar 12 by engagement of the screw 13 in a selected recess 11 in the cage establishes the depth to which the tube is to be expanded. As seen in FIG. 2, the rollers 23 are within the cage 1 and bearing on the reduced portion 18 of the mandrel 10. The forwardmost projection of the mandrel is established by the engagement of the limit ring 21 on the mandrel section 19 with the shoulder 29 formed by the reduction of the internal diameter of the cage. Here the drive of the motor utilized with the invention embodiment is reversed. To operate the expander retractively the motor is energized to reversely rotate the mandrel 10. An initial retraction of the mandrel relative the cage causes the rollers 23 to ride up on the expanding taper of the section 17 of the mandrel to engage the wall of the tube whereupon a reverse automatic self screwing action of the cage 1 and mandrel 10 is initiated. The expansion of the tube is thus commenced inwardly of its extremity at the tube sheet. The cage may be supported with one hand through the medium of the relatively freely rotatable sleeve 6 during the expansion process. The mandrel screws itself outwardly of the tube with and relative the cage 1 due to the skewed rollers 23 as described. The rollers ride up on the mandrel portion 16 of uniform cross-section as they are driven to effect tube expansion. When the mandrel reaches a position relative the cage where the rollers 23 are aligned with the tapered extremity 15 of the mandrel, the rollers ride smoothly down the taper and within the cage and tube expansion is completed. The assembly may be withdrawn since the rollers are out of contact with the tube.

It may thus be seen what a simple and effective tube expander unit is provided by the invention. The relative free bearing relation of the mandrel, the cage, and the sleeve 6 insures an absolute minimum of friction in the operation of the assembly. The automatic screw relation of the rollers 23 to the cage 1 and mandrel 10 as engaged to the tube insures that, after initial impulse is given to the mandrel for slight advancement relative the cage to project the rollers 23 into engagement with the tube wall, the advance or retraction of the assembly is automatically effected through the medium of the rollers. The limit devices as provided are simple yet positive in nature to insure maximum operating efficiency with minimum chance of damage to the expander components. It is to be noted that the particular incorporation within a single mandrel of means to provide for protractive or retractive operation as the occasion demands enables a substantial reduction in capital investment for those operating in the art as well as providing a degree of efficiency beyond that of the prior art devices which are individually either protractive or retractive in operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A tube expander including a cage, a mandrel concentrically mounting said cage in free bearing relation thereto, means contained between said mandrel and cage and projectable relative said cage to establish a frictional engagement of said mandrel to a tube for expansion thereof, said mandrel being so related to said projectable means to provide both projection and retraction thereof on relative movement of the mandrel and the cage in each of opposite directions.

2. A tube expander including a tubular cage element, a grip element on said cage to one end in free bearing relation thereto, a mandrel projecting within said cage in free bearing relation thereto, skewed slots in the other end of said cage, rollers within said slots contained in bearing relation to the mandrel within the cage, said mandrel having spaced reversely tapered portions rendering the tube expander operable to expand tubes by acting either protractively or retractively.

3. A tube expander including a pair of concentrically mounted elements, the outer of said elements having skewed slots therein uniformly angled in a common direction, means supported on the inner of said elements for projection and retraction in the slots thereby, said inner element being formed to cause both projection and retraction of said means in identical fashion on movement of the inner of said elements in a single direction relative said slots.

4. A tube expander including a cage, a mandrel mounted therein for movement relative thereto, limit means on said cage and said mandrel to establish a predetermined relative movement thereof in operation, said mandrel being formed with longitudinally spaced reversed tapers, and means freely bearing in said cage between said cage and said mandrel and projectable and retractable from said cage in sequence on relative movement of the mandrel in one direction.

5. A tube expander including an integral tubular body having a taper to one end and a grip sleeve freely rotatable on its other end, slots in the tapered end of said cage spaced equidistantly thereabout, a mandrel projecting in said cage, means mounting said cage in free bearing relation to said mandrel, said mandrel being axially adjustable relative said cage, means contained by said cage within said slots and bearing on said mandrel, said mandrel being formed with longitudinally spaced successively reversely tapered sections whereby, on direct axial movement of said mandrel relative said cage, said contained means will be smoothly and successively projected and retracted.

6. The structure as set forth in claim 5 characterized by said contained means being angularly disposed relative said mandrel and said tube so that on insertion of said cage in one end of a tube to be expanded and axial movement of the mandrel relative said cage to establish engagement of said contained means to the wall of the tube and rotation of said mandrel the cage and mandrel will automatically and relatively move relative the tube.

7. A tube expander including an expander body unit, means mounting said expander body unit in free bearing relation thereto, means mounted for movement in a generally radial sense from a relatively recessed to a projected position with reference to said body unit, said means mounting said expander body unit including portions successively operative on movement in one sense to successively project and provide retraction of said second mentioned means in predetermined sequence and similarly operative on movement in an opposite sense.

8. The structure as set forth in claim 7 and said means mounted to said body unit being formed and disposed to provide a self induced movement of said expander into or out of a tube in a projected position, the direction of the movement being dependent on the sense of movement of said portions of the means mounting the expander body unit.

9. A tube expander including a tubular body, a mandrel mounting said body for free relative rotation, bearing means connecting said body and mandrel including rollers to one end, said body having apertures opposite said rollers, said mandrel being axially adjustable relative said body and having reverse tapered sections at spaced locations successively operable on movement of the mandrel in either of opposite directions to successively provide projection and retraction of said rollers in continuous sequence enabling both protractive and retractive expander operation.

10. A tube expander including an integral tubular body, a mandrel within said body, bearing means mounting said body for free rotation on said mandrel, slots in said body aligned with a portion of said bearing means formed to enable limited projection thereof from said body, said mandrel having longitudinally spaced reversely tapered sections for gradual projection and retraction of said portion of said bearing means on axial movement of said mandrel relative said tubular body.

11. A tube expander comprising, a tubular body, a mandrel mounted in said body in free bearing relation thereto, a sleeve element retained on said body to one end thereof in free bearing relation thereto, said sleeve providing a manual grip for stabilizing said body and mandrel on relative rotation thereof, said mandrel being adapted for adjustment relative said body in an axial sense and having the expanding means associated therewith adapted on rotation of said mandrel and adjustment thereof in an axial sense relative said body, in a single direction, to sequentially project and retract said tube expanding means relative said body, adjacent one end thereof, to effect a uniform and smooth tube expansion.

12. A tube expander including a mandrel having means connected for reversible drive thereof, a slotted cage containing bearings to said mandrel providing free rotation thereof on said mandrel, a grip sleeve freely rotatable on said cage to one end, said mandrel being formed for axial adjustment relative said cage, means on said mandrel and said cage limiting the relative axial adjustment thereof and said mandrel being formed to operate to expand tubes by acting either protractively or retractively on said bearings.

References Cited in the file of this patent

UNITED STATES PATENTS

| | | |
|---|---|---|
| 1,153,663 | Wiedeke | Sept. 14, 1915 |
| 1,601,329 | Slesazeck | Sept. 28, 1926 |
| 1,747,376 | Maupin | Feb. 18, 1930 |
| 1,921,810 | Duchesne | Aug. 8, 1933 |
| 2,772,716 | Stary | Dec. 4, 1956 |
| 2,839,121 | Mock et al. | June 17, 1958 |
| 2,854,058 | Baker | Sept. 30, 1958 |